United States Patent
Neumann et al.

(10) Patent No.: US 11,860,132 B2
(45) Date of Patent: Jan. 2, 2024

(54) MATERIAL ANALYSIS DEVICE WITH QUICK ATTACHMENT

(71) Applicant: NETZSCH-Gerätebau GmbH, Selb (DE)

(72) Inventors: Georg Neumann, Schönwald (DE); Marco Zier, Fichtelberg (DE); Patrick Biermann, Seelze (DE); Jürgen Tschöpel, Arzberg (DE); Reinhard Gschwendtner, Marktredwitz (DE); Wiebold Wurpts, Schwarmstedt (DE); Markus Hilmer, Lehrte (DE); Leonhard Faulhammer, Selb (DE); Stephan Lauer, Wedemark (DE); Kai Dinges, Grethem (DE); Claas Luhmann, Isernhager (DE); Michel Bellmann, Wedemark (DE); Georg Storch, Selb (DE)

(73) Assignee: NETZSCH-Gerätebau GmbH, Selb (DE)

( * ) Notice: Subject to any disclaimer, the term of this patent is extended or adjusted under 35 U.S.C. 154(b) by 117 days.

(21) Appl. No.: 17/662,090

(22) Filed: May 5, 2022

(65) Prior Publication Data

US 2022/0357250 A1 Nov. 10, 2022

(30) Foreign Application Priority Data

May 5, 2021 (DE) ...................... 10 2021 111 641.4

(51) Int. Cl.
*G01N 3/02* (2006.01)
*G01N 3/32* (2006.01)

(52) U.S. Cl.
CPC ......... *G01N 3/02* (2013.01); *G01N 2203/003* (2013.01); *G01N 2203/0092* (2013.01); *G01N 2203/0228* (2013.01)

(58) Field of Classification Search
CPC .......... G01N 3/02; G01N 35/028; G01N 3/18; G01N 19/02; G01N 3/56; G01N 1/18;
(Continued)

(56) References Cited

U.S. PATENT DOCUMENTS

| 2016/0169808 A1* | 6/2016 | Atzler ................... G01N 27/223 435/8 |
| 2016/0274015 A1* | 9/2016 | Hadj Henni ........... G01N 11/16 |
| 2016/0349199 A1* | 12/2016 | Warminska ............ G01N 25/00 |

FOREIGN PATENT DOCUMENTS

DE 69724021 T2 9/2003

OTHER PUBLICATIONS

Netzsch; "Analyzing & Testing Dynamic Mechanical Analysis—DMA 242 E Artemis"; Feb. 1, 2020; Retrieved on Sep. 30, 2022; 24 Pages.

(Continued)

*Primary Examiner* — Brandi N Hopkins
(74) *Attorney, Agent, or Firm* — Whitmyer IP Group LLC (57) ABSTRACT

A material analysis device for analysing a material sample. The material analysis device is equipped with a—generally temperature-controllable—sample chamber and a sample holder, which, supported by at least one pillar, protrudes into the sample chamber, and a loading shaft, to one end of which force is applied by an exciter, and the other end of which bears a connecting member, with which it transmits force to the sample in a defined manner and loads same thereby.

17 Claims, 9 Drawing Sheets

(58) Field of Classification Search
CPC .......... G01N 3/32; G01N 19/00; G01N 25/00;
G12B 5/00; G05B 19/44; G01T 7/08;
G01B 7/002; G01B 5/252; G01B 5/012;
G01B 5/008; H01H 37/56; B01L
3/50825; B04B 9/08; B23H 7/26
See application file for complete search history.

(56) References Cited

OTHER PUBLICATIONS

German Search Report; Application No. 10 2021 111 641.4; dated Feb. 7, 2022; 9 pages.
Extended European Search Report; Application No. 22171340.7; Completed: Sep. 30, 2022; dated Oct. 10, 2022; 8 Pages.

\* cited by examiner

MATERIAL ANALYSIS DEVICE WITH QUICK ATTACHMENT

The invention relates to a material analysis device for analysing a material sample, having a quick fastening for the probe shaft and/or the sample holder.

TECHNICAL FIELD

Devices such as that according to the invention are used not only, but preferably, for dynamic mechanical analysis. Dynamic mechanical analysis (DMA) is an indispensable method for determining the viscoelastic properties of mainly polymeric materials. There is a demand here for material analysis devices having a modular design. This modular design should also in particular allow the device to be operated with a plurality of different sample holders and different probe shafts. It is thus possible to simulate virtually all conceivable load scenarios with one device. Until now, these sample holders and the associated probe shafts have been screwed into the material analysis device in each case. Screw connections are secure, can reliably transmit the necessary forces, and can also be produced and undone again quickly.

BACKGROUND

Although the previously known material analysis devices function well and reliably, and their setup can also be changed relatively well, a further shortening of the setup times for such a material analysis device is desirable.

SUMMARY

The above object is achieved with the features of Claim 1 in their entirety.

Accordingly, a material analysis device for analysing a material sample is proposed, which is preferably equipped with a sample chamber, which can be loaded from its upper side, in which case it can be closed with a cover, and can mostly be temperature-controlled. It has a sample holder, which is held in position by means of one, two or more pillars; the sample holder is preferably suspended from the cover by means of pillars. To position the sample holder, often two or, better, even more pillars supporting the sample holder are used. In the preferred case in which load is applied from above, the pillars allow the sample holder to project into the sample chamber downwards from the cover.

Furthermore, the material analysis device has a loading shaft. This is loaded with force at one end by an exciter. At its other end, the loading shaft bears a probe shaft, which the practitioner often also refers to as "insert adapted to the sample geometry", but for reasons of unity of invention the patent term "probe shaft" is retained below. It uses this to transmit force to the sample in a defined manner. In doing so, it loads the sample.

According to the invention, the material analysis device is characterised in that the loading shaft forms a bushing at its end facing the sample chamber. This bushing accommodates an insertion section of the probe shaft when ready for operation. Said bushing has at least one lateral window. A key, preferably in the form of a flat key having a flat key face, can be inserted through said lateral window into the groove in the insertion section behind. The key is typically inserted in a purely radial direction in relation to the longitudinal axis of the probe shaft.

In this way, the probe shaft can be anchored interlockingly and without play on the loading shaft. This key connection has the great advantage that it can be produced and undone rapidly, and generally without tools. With suitable, forced preloading, it is also always produced correctly by itself. This not only reduces the setup time but may also improve operating safety. This is because there are no longer any problems with inadvertently incorrectly tightened screw connections. There is also no or, in comparison with a screw connection, only a small risk of the key connection undesirably coming undone.

Ideally, the bushing of the loading shaft forms a first centring taper, preferably in the form of a centring taper seat. Said centring taper seat, together with a second, preferably male centring taper formed on the insertion section of the probe shaft, centres the probe shaft relative to the loading shaft. To this end, the key is preferably shaped, positioned and preloaded such that it draws the two centring tapers into one another, which, preferably viewed towards the sample space, are attached below the sample space. In this way, the quick fastening according to the invention necessarily ensures optimal centring.

It is particularly favourable if a flexible spring is fastened to the outside of the loading shaft. This flexible spring preloads the key in the radial direction towards the loading shaft. The flexible spring is preferably designed in the manner of a leaf spring fixed at only one of its ends.

The key is preferably connected at its outward end to the leaf spring such that the leaf spring can also transmit tensile forces to the key. The leaf spring thereby becomes the universal actuating element for the key, in both directions. Thanks to its naturally not inconsiderable size, it also allows the key to be removed again easily. In particular, the leaf spring can be actuated well in a motorised manner, and in the majority of cases without an additional motor being needed for this.

For the latter purpose, it is particularly favourable if the leaf spring has an elongated, preferably radially obliquely outwardly angled free end, which protrudes beyond the key in the direction of the longitudinal axis of the loading shaft. This elongated end, which ultimately has a key effect itself, can be used to come up against a stop as the loading shaft is further introduced into the sample space. The stop is then shaped and positioned such that the loading spring catches on the stop and is spread outwards on further introduction.

The spring then pulls the key out of the groove such that the probe shaft can be removed from the loading shaft.

Together with the above-described claim features, but also alone, independently only with the features of the preamble of Claim 1, protection is also sought for a material analysis device, the sample chamber wall or cover of which has a holding opening for each of multiple pillars of the sample holder. The free end of the respective pillar can be inserted into this holding opening. The free end of the pillar in question has a groove. A key mounted movably in the cover can be inserted, preferably in a purely radial direction in relation to the longitudinal axis of the pillar, into said groove.

In this way, the end of the pillar in question can be anchored interlockingly and without play on the sample chamber wall or on the cover, generally without tools. Since this anchoring is also of substantially the same type as that used for the probe shaft, it also has the advantages mentioned there.

It is particularly favourable if the holding opening is designed completely or partially as a blind hole which is open towards the sample space, that is, generally downwards. This blind hole is generally designed such that the key mounted in the cover clamps the free end of the pillar assigned to it between its key face and the bottom of the blind hole. Unlike with the probe shaft, there is generally no centring here. Therefore, the connection can be made simpler than that described for the probe shaft.

Ideally, a synchronous actuation reproduction mechanism is integrated in the sample chamber wall or in the cover. Said mechanism is designed such that it actuates all the keys of the different pillars of a specific sample holder synchronously, i.e. pushes them into or pulls them out of the grooves in the pillars synchronously. Such a synchronous actuation reproduction mechanism leads to a considerable time saving during setup in comparison with the previous state, in which multiple screw connections must be undone one after the other in order to install and remove each sample holder.

Preferably, the synchronous actuation reproduction mechanism has an eccentric. During corresponding rotation, said eccentric exerts a compressive force on the at least one first key, which force pushes said key into a groove in a pillar. At the same time, tension is exerted on a displacement frame. When said displacement frame is pulled into another position thereby, it in turn exerts a compressive force on at least one second key. The compressive force pushes this key into a groove in another pillar. On corresponding rotation in the opposite direction, the eccentric releases said keys so that they can move back again. Alternatively, the eccentric is force-coupled to the keys such that it pulls them back actively.

For this purpose, it is particularly favourable if the keys communicate with the eccentric and the displacement frame not directly but via spring elements. Particularly favourable spring elements in this case are flexible bar springs. This is because not only a compressive force but also a tensile force can be exerted particularly well on the keys, in the manner of a real forced actuation, via such flexible bar springs. This leads to a particularly problem-free solution.

DETAILED DESCRIPTION

Figure 1:
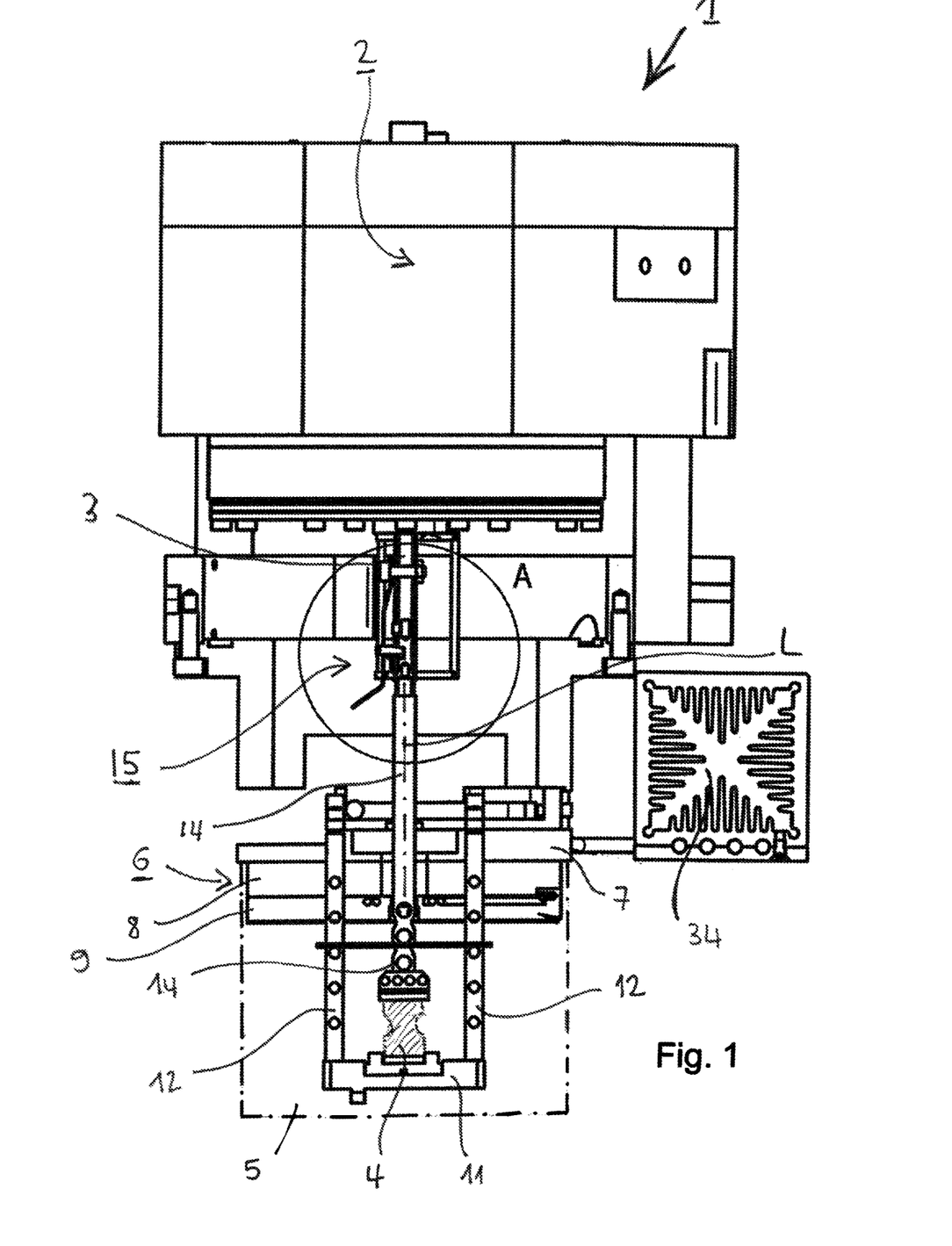
FIG. 1 shows the material analysis device according to the invention in the ready-to-operate state and provides an overview.

FIG. 1 provides a good overview of the material analysis device 1 according to the invention.

The material analysis device 1 comprises a vibration exciter 2. The vibration exciter 2 applies vibrations to a loading shaft 3. The latter transmits these vibrations to a sample 4, which is sketched only very generally here.

The material analysis device 1 also comprises a sample chamber 5, which is shown only diagrammatically in FIG. 1. This sample chamber 5 is substantially closed by means of a cover 6 during operation. The desired test temperatures can be established in the sample chamber. Optionally, it is also possible to apply radiation, for example UV radiation, to the test object. If necessary, misting or steam application with liquids which, for example, have a corrosive effect or attack or influence the plastic material in another way is also possible. Similar conditions can optionally also be implemented with the aid of immersion in a suitable immersion bath.

It can also be easily seen in FIG. 1 that in this exemplary embodiment a region outside the sample chamber, between the sample chamber and the measurement system, is automatically cooled by a cooling system based on heat pipe technology. To this end, a support plate 7, which is preferably in the form of a cooling plate, lies above the insulation 8 and thus between the sample chamber and the measurement system. The support plate 7 can be a layer of the multi-layered cover 6, as sketched here, but can also be completely independent of the cover 6, which is not shown in the figures here.

The cooling plate 7 eliminates or reduces the loading on the measurement system, in this case situated above the sample chamber, by heat from the sample chamber. Fluid coolant preferably flows through the cooling plate 7 and is cooled back down via a cooling device 34. However, the cooling plate 7 can also function in the manner of a "heat pipe", as is used in laptop construction.

It is particularly favourable to implement the cooling such that the cooling plate 7 is provided with a mostly radial bore. A tubular heat pipe is inserted into this bore, usually using a thermally conductive paste in order to produce an optimal heat transfer. The heat pipe used is longer than the bore in the cooling plate receiving it. Therefore, it protrudes laterally out of the cooling plate 7. As can be seen easily in FIG. 1, for example, the part protruding laterally out of the cooling plate 7 extends into the cooling device 34. There, it is accommodated by a groove or bore in a typically finned cooling body, which for its part acts as a heat sink and is typically subjected to cooling air by a fan.

Such a "heat pipe" of the type used here is typically hermetically sealed and cannot be opened without being destroyed.

The heat pipe is typically designed such that a fluid circulates in it, driven solely by the temperature difference, possibly supported by capillary action, said fluid absorbing heat at one end of the heat pipe, transporting it to the other end of the heat pipe, and then emitting it outwards there.

To go into somewhat more detail in respect of the heat pipe used according to the invention, the following can be said about the heat pipes to be used by preference:

The cooling plate 7 inevitably conducts a certain heat flow, specifically the heat loss which the insulation 8 was able to overcome. The heat input in the region of the cooling plate increases the temperature of the vessel forming the heat pipe, typically a copper pipe, and of the working medium therein until the boiling point of the working medium is reached. The working medium then begins to evaporate. The temperature does not increase any more, instead, all the energy conducted further is converted into evaporation heat.

As a result, the pressure in the heat pipe is locally increased above the liquid level, which results in a slight pressure gradient within the heat pipe. The steam produced begins to spread out in the entire available volume, i.e., it flows to wherever the pressure is lower; at the points where its temperature falls below the boiling point of the working medium, it condenses. To do this, the steam must emit energy to the vessel, and the vessel must emit energy to the surroundings. This happens the most at the point where the condenser is situated, in which active cooling can take place, that is, in the region of the cooling device 34.

The temperature then does not fall any more, until all the latent heat, the condensation heat, has been emitted to the surroundings.

The liquid fraction of the working medium returns to the evaporator as a result of the capillary forces developed by the metal mesh typically installed in the pipe used here as the heat pipe. Alternatively, the heat pipe used can also be a pipe which does not have a smooth inner side but is provided with fins which run in the direction of the pipe longitudinal axis and enclose free spaces between them, which can be regarded as capillary grooves.

Preferably, the insulation 8 is a high-temperature-resistant plate of inorganic material, usually based on dispersed amorphous silica. This plate will often also have special infra-red opacifiers, so that any infra-red radiation produced in the sample chamber 5 also cannot easily overcome the insulation. On one side of the insulation 8, in the sample chamber, there is usually so-called cover heating 9, which is used for temperature control of the sample chamber.

The sample is held in position in the sample chamber 5 with the aid of a sample holder 10. The sample holder 10 usually consists of a type of sample table or sample cross member 11. This is in turn held in position with the aid of pillars 12. To this end, a pillar anchoring means 13 is arranged on the outside of the cover. This preferably comprises a synchronous actuation reproduction mechanism, as is described in more detail below. The pillars protrude through through-openings, assigned to them, in the cover into the region of the pillar anchoring means 13.

Figure 2:
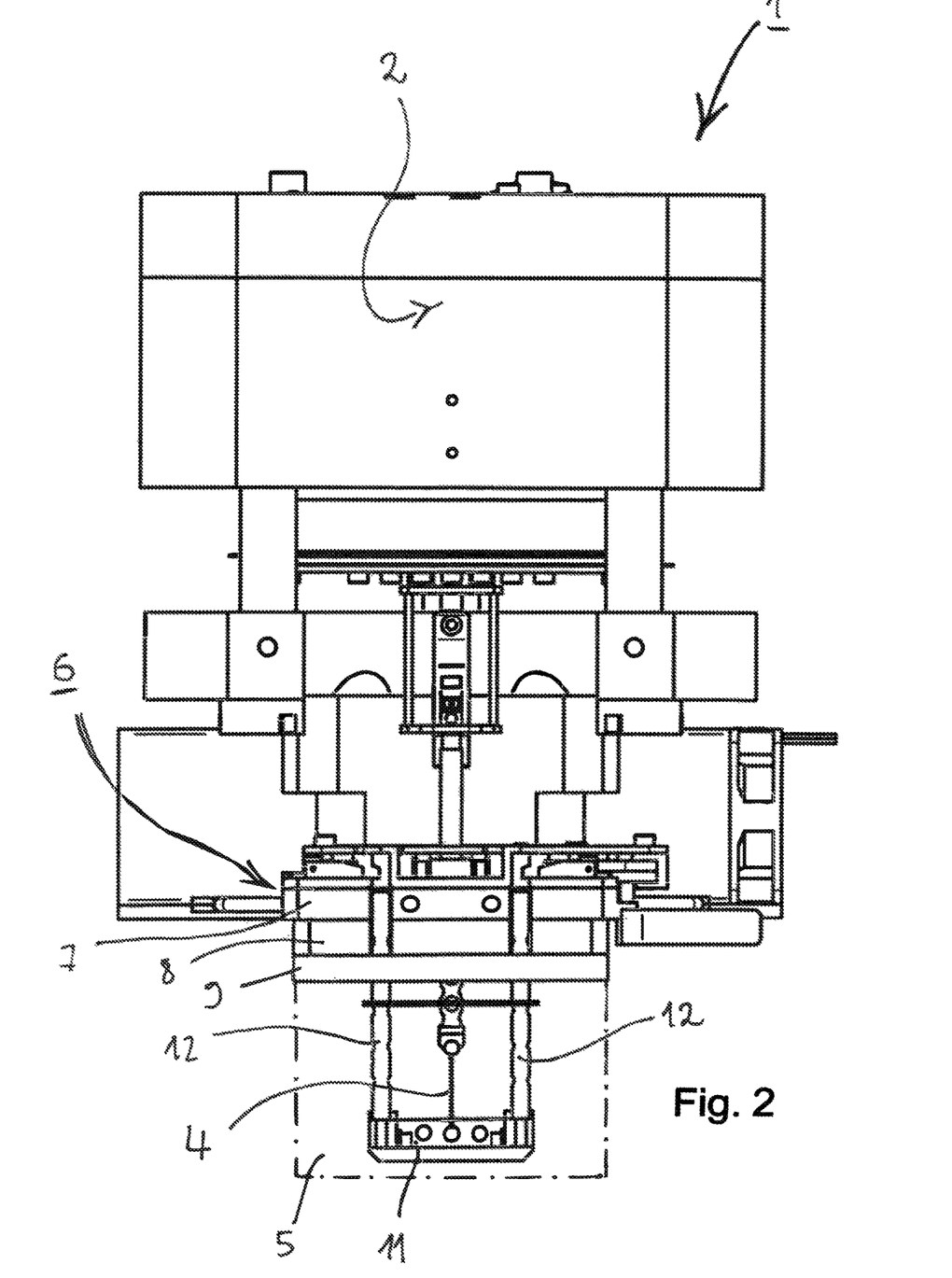
FIG. 2 shows the material analysis device according to the invention in the ready-to-operate state from the side, from a viewer position rotated 90° relative to FIG. 1.

It can also easily be seen that the loading shaft 3 applies the vibrations communicated to it by the vibration exciter 2 to the sample not directly but via a probe shaft 14 coupled thereto. The coupling which couples the loading shaft to the probe shaft 14 in this case has reference sign 15. The coupling 15 is shown only roughly in FIGS. 1 and 2 and is explained in more detail below. The probe shaft 14 projects through a through-opening assigned to it, in the cover into the region of the sample chamber 5.

It is notable that the probe shaft 14 is hollow-bored, preferably at least in the region with which it protrudes into the sample chamber 5. Typically, it also has a number of radial windows. In this way, the cross-section available for heat conduction on the probe shaft 14, via which heat can flow out of the sample space along the probe shaft and into a region outside the sample space, is kept small.

The pillars 12 holding the sample table or sample cross member 11 are preferably also designed similarly in respect of their reduced thermal conductivity. This has the same reason as explained for the probe shaft.

Figure 3:
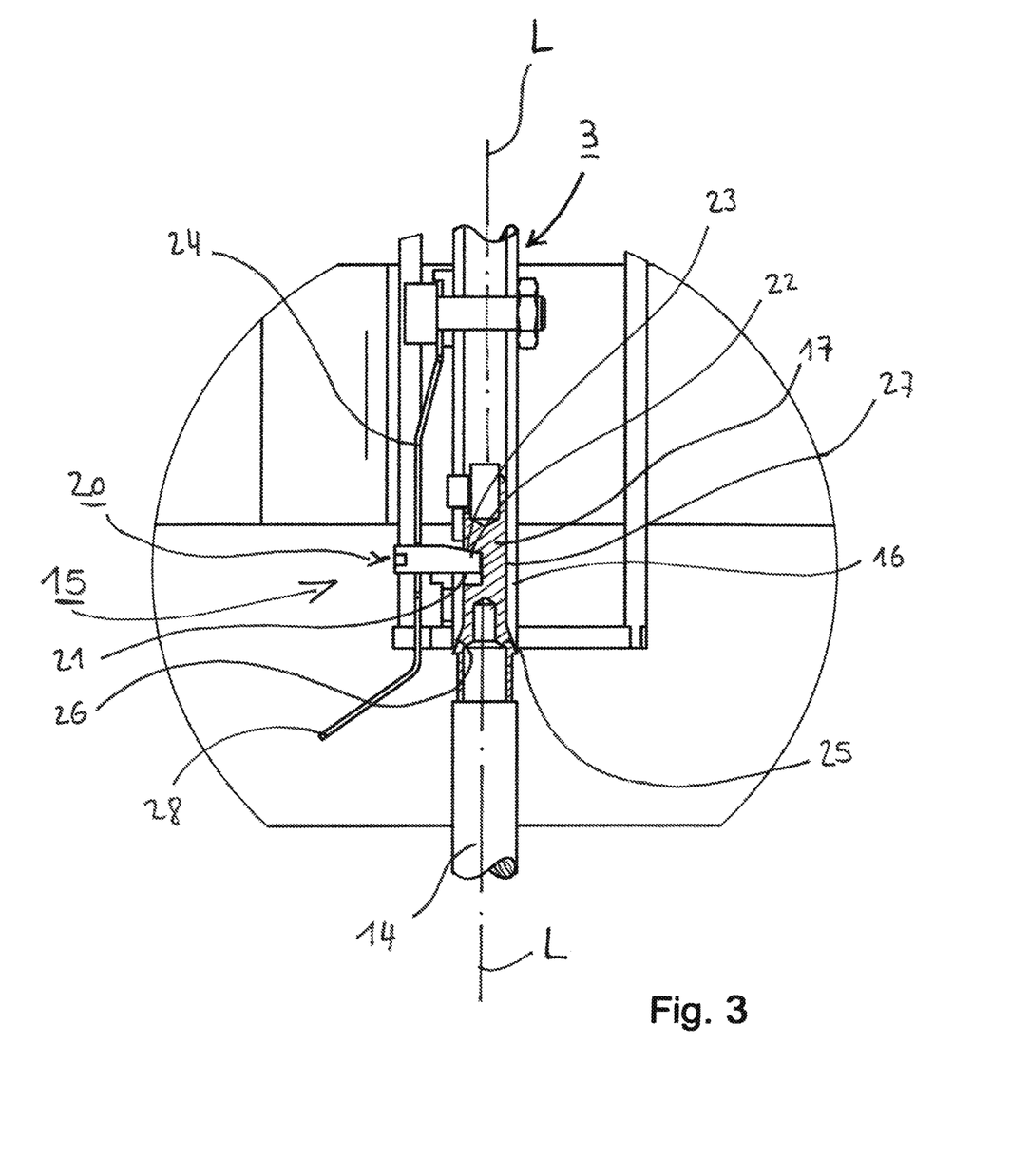
FIG. 3 shows a detail with an exemplary embodiment which illustrates well how the probe shaft is connected according to the invention to the loading shaft.

FIG. 3 shows the coupling 15 and presents in detail how the probe shaft 14 is coupled to the loading shaft 3.

The loading shaft 3, which is hollow at least at its end facing the probe shaft, can easily be seen here. This hollow end forms a bushing 16. In the present case, the probe shaft 14 bears an in this case male coupling piece 17 at its end. This design is particularly expedient because the key does not then have to be pulled completely out of the window assigned to it for decoupling.

Expediently, the coupling piece 17 is screwed onto the probe shaft 14. Unlike the probe shaft 14, the coupling piece 17 will generally be solid. The coupling piece 17 is inserted into the bushing 16 of the loading shaft 3 for coupling. As can be seen, the coupling piece 17 has a groove 18 which is accessible radially from the side. In the fully coupled state, the groove 18 comes to lie behind a window 19 in the bushing 16. A key 20 is inserted through the window.

The key 20 can be in the form of a round key or, which is clearly preferred, a flat key.

The flat key is shown schematically here. In this case, the flat key has a planar, purely radially oriented lower sliding face 21. Opposite this, it has a usually likewise planar, obliquely running key face 22. The key face 22 interacts with a counter key face 23 on the coupling piece 17.

The key 20 is preloaded in the radial direction towards the coupling piece 17 by a spring element, which in this case is preferably formed by the leaf spring 24. This means that the leaf spring 24 forces the key 20 into the groove 18. By the key face 22 of the key 20 and the counter key face 23 of the coupling piece sliding on one another on one side and the key 20 being supported by its lower sliding face 21 on the edge of the window 19 on the other side, the coupling piece 17 tends to be drawn deeper into the bushing 16 of the loading shaft. Centring occurs automatically as a result. This is because the outer taper 25 of the coupling piece 17 is thereby pulled into the taper seat 26 right at the end of the bushing 16 of the loading shaft 3. In this way, the play, although usually small, which the cylindrical shank 27 of the coupling piece 17 must naturally have in relation to the inner surface of the bushing 16 is made safe. It can also be easily seen that this type of coupling enables the loading shaft 3 to transmit vibrations to the probe shaft 14 both in one direction along its longitudinal axis L and in the opposite direction without losses.

It can also be easily seen that the key 20 is fixed interlockingly in the region of its radially outer end to the leaf spring 24. To this end, the leaf spring 24 can have a window. The key protrudes through this window. The leaf spring 24 is in this case characterised in that only one of its ends is clamped, as can be seen. Preferably, a type of pipe clip 28 is used to clamp its end. Said pipe clip fits locally around the loading shaft 3 and fixes said end of the leaf spring 24 immovably on one side. The opposite end of the leaf spring 24 preferably forms a section 29 which is angled or in any case runs obliquely relative to the longitudinal axis L of the loading shaft. Its function is explained in more detail below.

Figure 4:
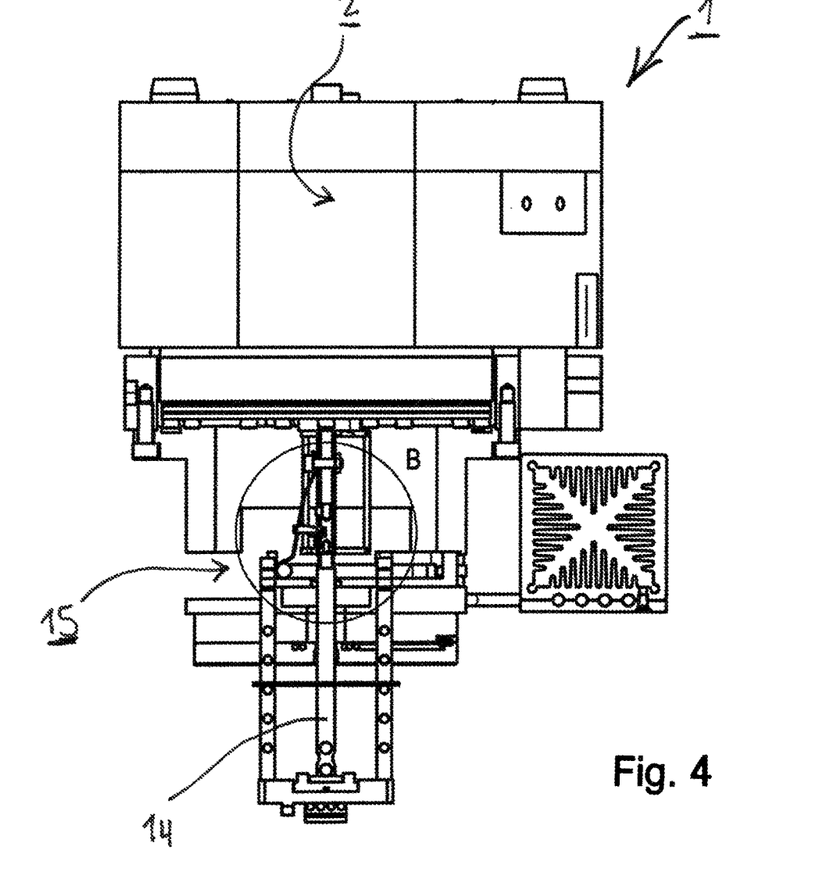
FIG. 4 shows an overview of the way in which the probe shaft can be removed.
Figure 4A:
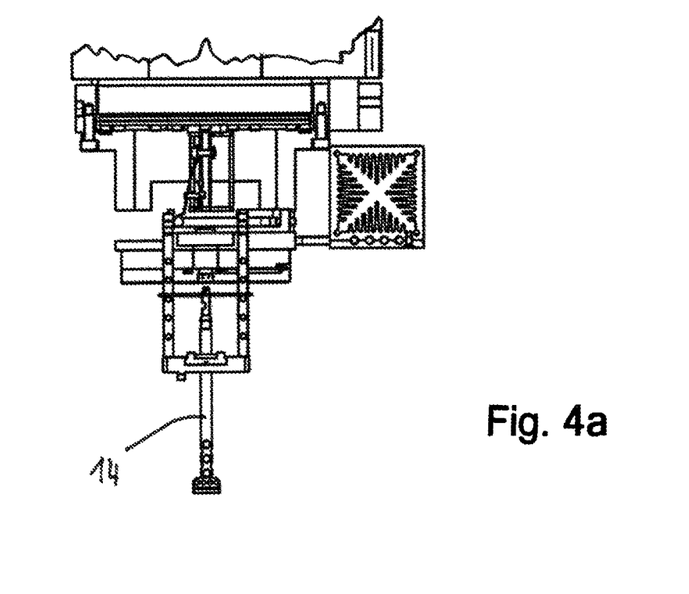
FIG. 4a shows, with the aid of a smaller drawing, the probe shaft removed and separated from the material analysis device.

FIGS. 4 and 4*a* show clearly, when compared with FIG. 1, how the loading shaft can be detached in a remote-controlled, motorised manner here. FIG. 1 shows the material analysis device, as mentioned, in its ready-to-operate state. The vibration exciter 2 can be moved up and down in a motorised, usually remote-controlled manner, by means of vertical guides (not shown). This movability is actually used to be able to position the end of the probe shaft exactly so that it can be coupled precisely to the sample 4. However, this movability is now "diverted from its use" or subjected to a secondary use according to the invention. As can be seen easily from FIGS. 4 and 4*a*, the vibration exciter 2 is moved downwards to undo the coupling 15. In the process, the obliquely running section 29 of the leaf spring comes up against a stop 30 at some point. As the vibration exciter continues to move downwards, the obliquely running section 29 is bent outwards precisely because of its slope acting in a wedge-like manner. This means that the leaf spring is pivoted, in this case clockwise. In the process, it pulls the key 20 out of the groove 18. In this way, the probe shaft 14 is unlocked. It can then be pulled out of the loading shaft 3, as shown in FIG. 4*a*.

Figures 5, 6:
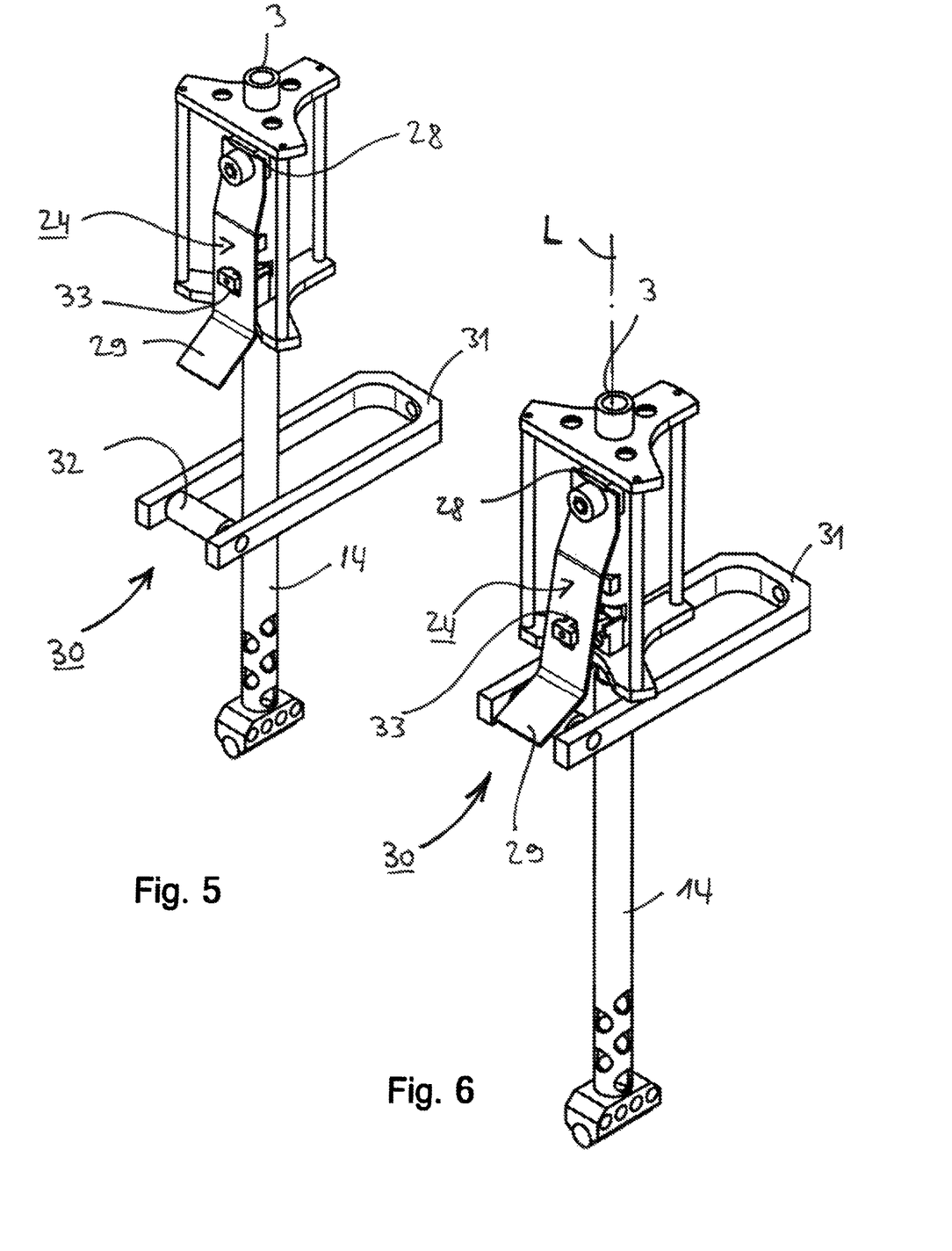
FIG. 5 shows the actuating mechanism in the probe shaft in the ready-to-operate position.
FIG. 6 shows the actuating mechanism for the probe shaft during removal of the probe shaft.
Figure 7:
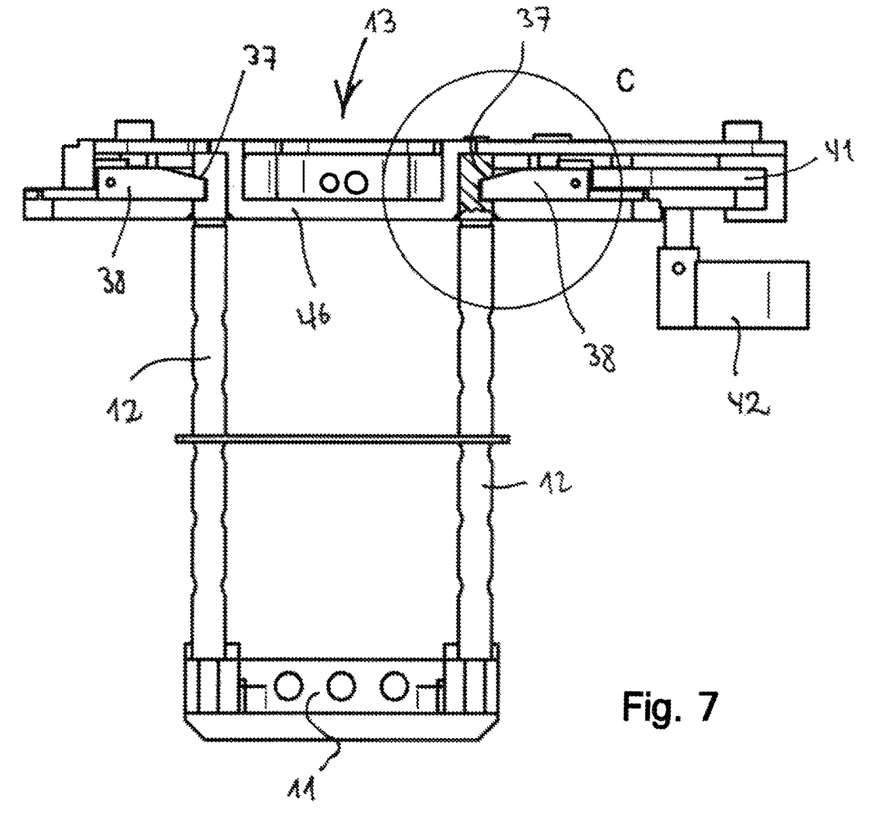
FIG. 7 shows the fastening according to the invention of the pillars of the sample holder on the cover of the sample space.
Figure 8:
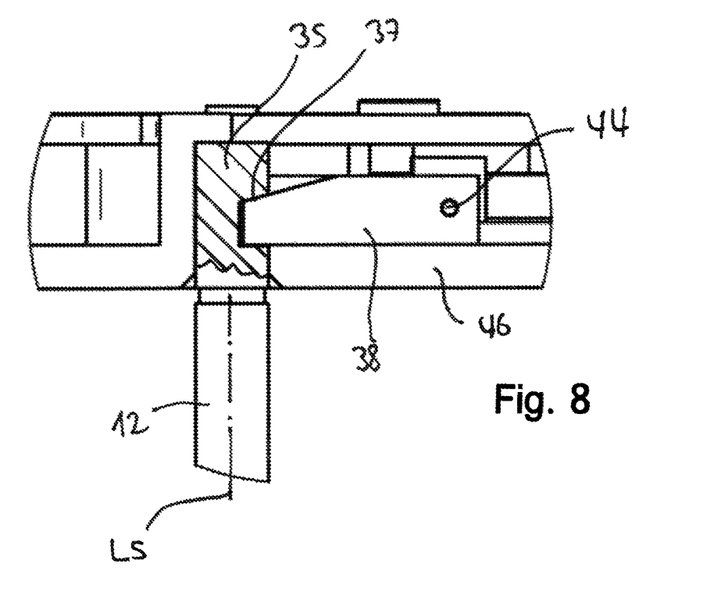
FIG. 8 shows a detail of FIG. 7.

FIGS. 5 and 6 show more detail. The leaf spring 24, held at its upper end preferably clamped by the pipe clip 28, can be seen very well here. The stop 30 is in this case formed favourably by the shackle 31, which is mounted in a stationary manner on the material analysis device and bears a roller 32.

FIG. 5 shows the whole thing in the ready-to-operate position. FIG. 6 shows the whole thing after the vibration exciter 2 has been moved down far enough. As can be seen, the obliquely running section 29 of the leaf spring 24 then rolls on the roller 32 of the stop. The leaf spring 24 is thereby drawn outwards in an almost frictionless manner.

It is notable that the connection between the key 20 and the leaf spring 24 can also be seen easily in these figures. As can be seen here, the leaf spring 24 bears a window 33. The end of the key 20 is fixed interlockingly to the window or preferably between two jamb sides of the window. Ideally, the key will have an end which is grooved on two opposing sides for this purpose, as can be seen in FIGS. 5 and 6.

Preferably, the cross-section of the key is not square but rectangular at its end. The window 33 reproduces the same rectangular cross-section but rotated 90°. In this way, the key can be inserted into the window 33 during assembly until its two grooved sides are at the same height as the line of the window 33. The key 20 is then rotated 90° into its end position. In this way, two mutually opposing jambs of the window 33 then engage interlockingly in the two grooves at the end of the key. In this way, the key can be forced to and fro by the leaf spring, perpendicular to the longitudinal axis L of the loading shaft. Of course, other fastening types are also conceivable, such as a screw-fastening of the key to the leaf spring.

The manner in which the pillars of the sample holder are fastened to the cover so that the sample holder hangs down into the sample space from the cover of the sample space is shown best in FIGS. 7 to 12.

Figure 11:
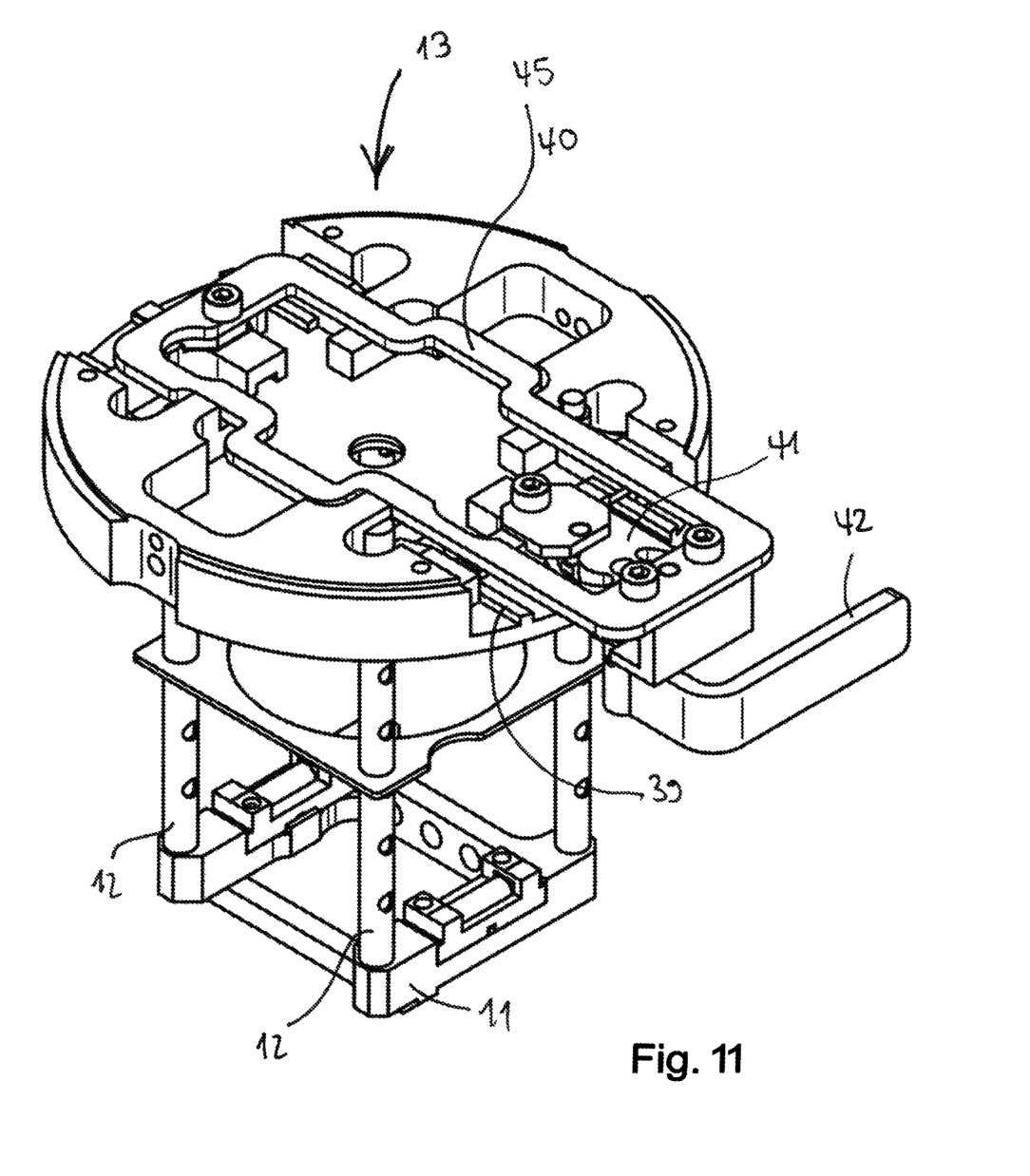
FIG. 11 shows an exemplary embodiment of the synchronous actuation reproduction mechanism according to the invention for the pillars of the sample holders.

FIG. 11 provides an overview of the pillar anchoring means 13, which forms the outermost part of the cover 6 facing away from the sample chamber, as shown in FIG. 1. The pillars to be fastened protrude through cut-outs in the cover into the region of the outside of the cover, where the pillar anchoring means is attached. The whole thing has the advantage that the pillar anchoring means remains substantially cold, approximately at room temperature.

Blind holes are entirely or partially provided in this usually planar pillar anchoring means. Each of these blind holes receives a coupling piece 35 of the respective pillar 12. As can be seen, the term blind hole in this case means a hole which forms a stop for the upper end face of the coupling piece 35. The coupling piece 35 has a lateral groove 36. The groove 36 has at least one groove flank which faces the stop of the blind hole and forms a key face 37.

The coupling piece 35 is fixed in that a movable key 38 is inserted. It could be a round key. However, a flat key, as shown schematically here, is much more suitable. By means of its preferably upper key face, which interacts with the key face 37 on the groove flank, the coupling piece 35 is clamped between the key 38 and the stop of the blind hole. In this way, the relevant pillar 12 is immobilised in and counter to the direction of its longitudinal axis LS. Movements transverse or oblique to the longitudinal axis LS of the pillar 12 are prevented by the circumferential walls of the blind hole. The key 38 slides on its side facing the sample space on a planar face of the pillar anchoring means 13. It generally also has planar sides on which it is guided laterally.

Each pillar 12 is individually assigned such a key coupling.

An optional special feature is that the four or more keys are actuated synchronously. A synchronous actuation reproduction mechanism is provided to this end. This is capable of retracting the keys in the manner shown in FIGS. 9 and 10. The key tip is then completely disengaged from the groove 36.

Figure 9:
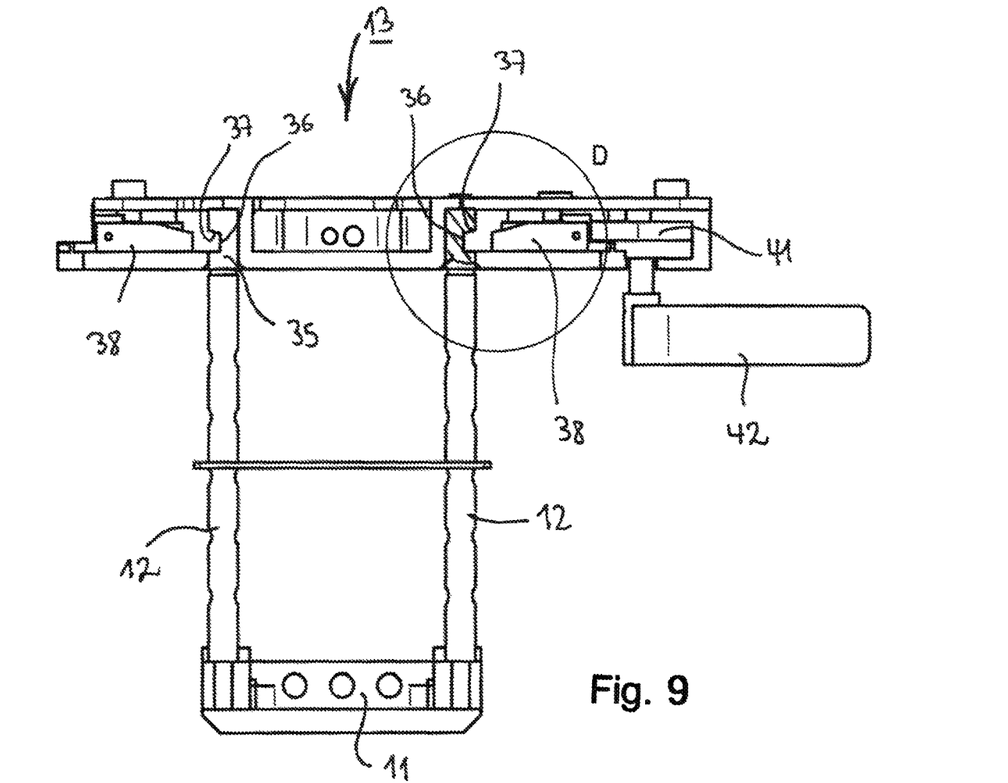
FIG. 9 shows the fastening according to FIG. 7 in the undone state.
Figure 10:
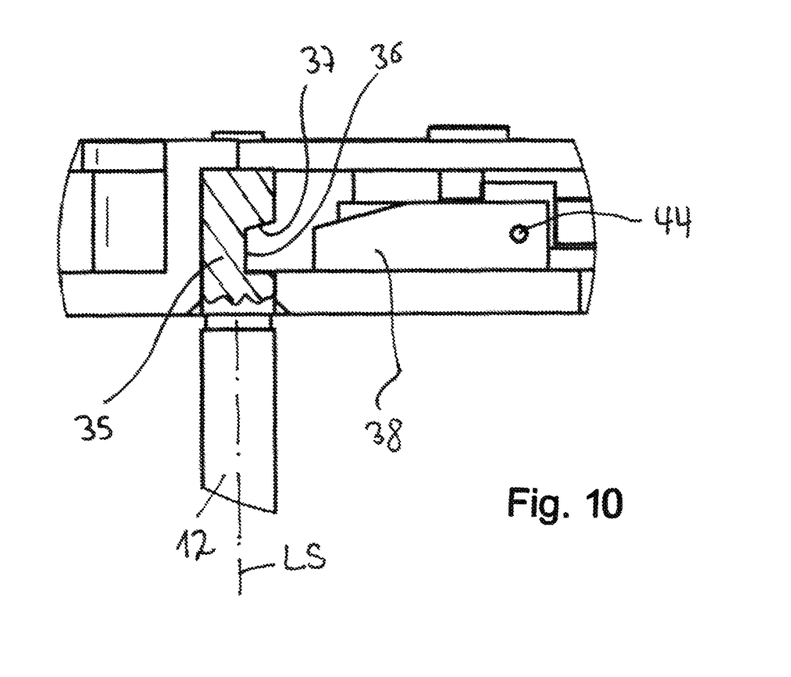
FIG. 10 shows a detail of FIG. 9.

The sample table 11 can then be removed downwards together with the pillars 12.

Figure 12:
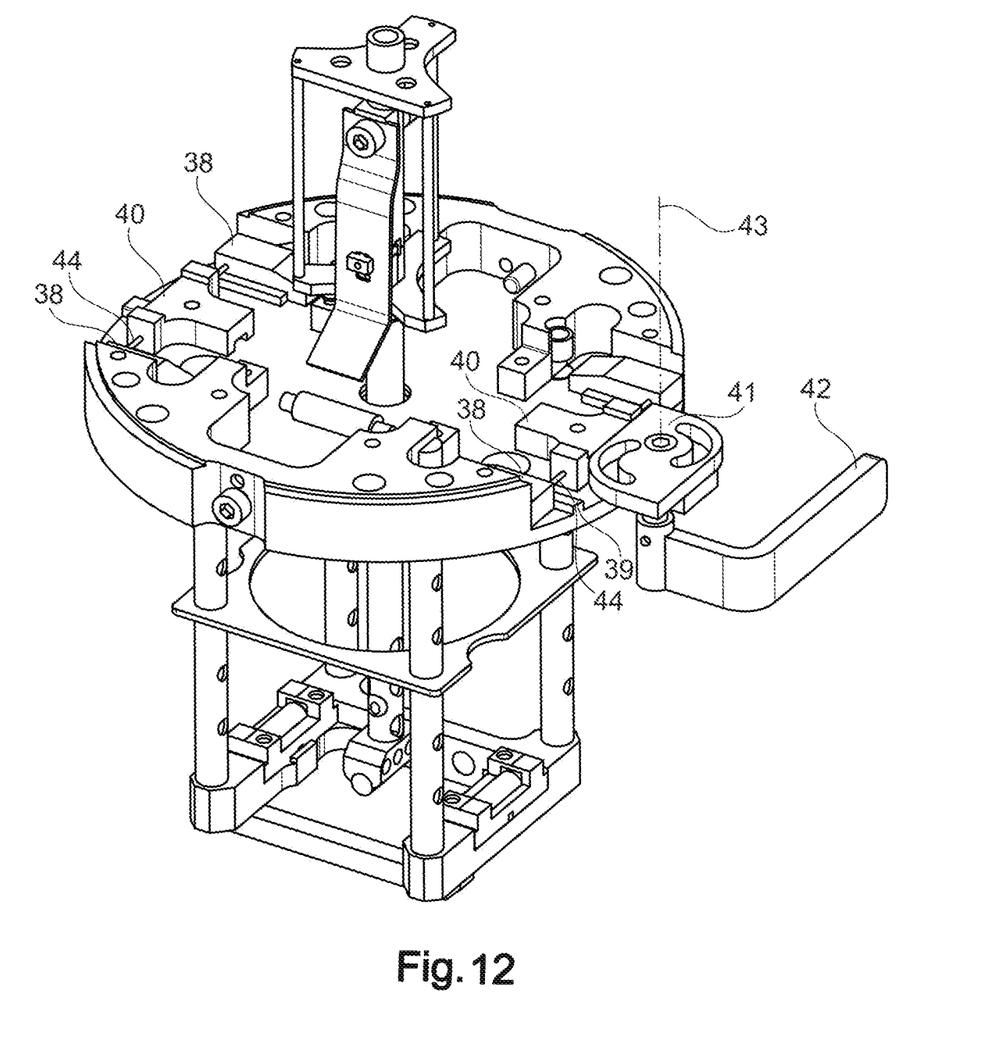
FIG. 12 shows an exemplary embodiment of the synchronous actuation reproduction mechanism according to the invention for the pillars of the sample holders, but partially cut away so that the keys and their actuation can be seen more easily.

The structure of the synchronous actuation reproduction mechanism, which is part of the pillar anchoring means here, is shown best in FIGS. 11 and 12.

The reader should turn to FIG. 12 first, for the sake of better understanding.

Various components which can still be seen in FIG. 11 and block the view of the critical parts are cut away in FIG. 12. As can be seen, the keys 38 run to and fro in a groove or a limited depression in the plate 46. The plate 46 is part of the pillar anchoring means 13. To this end, preferably lateral guide strips 39 are provided next to each key, as can be seen relatively well. A joint actuating slide switch 40 is assigned to each pair of keys 38.

On close examination, it can be seen that each key is connected to the actuating slide switch 40 via an elongate cylindrical element. The elongate cylindrical element ends at one of the long, narrow side faces of the key. The elongate cylindrical element is a spring element, preferably in the form of a flexible bar spring.

In addition, a double eccentric 41 is mounted pivotably in the plate 46. With the aid of its pivot handle 42, the double eccentric 41 can be rotated about the eccentric axis 43. As soon as the pivot handle 42 is rotated clockwise to actuate the double eccentric 41, one eccentric, in this case the eccentric facing the viewer, of the double eccentric 41 presses on the actuating slide switch 40. The actuating slide switch 40 is thereby pushed to the left in the present case. As a result, the keys 38 which are each connected to the actuating slide switch 40 via a flexible bar spring 44 are pushed out of their open position into their closed position.

If FIGS. 11 and 12 are viewed side by side, it can be seen how the synchronous actuation reproduction mechanism functions. Specifically, the synchronous actuation frame 45 belongs to it. The second eccentric of the double eccentric 41 bears against the end, on the right-hand side in this case, of the synchronous actuation frame from the inside. The same movement of the double eccentric which moves the actuating slide switch 40 facing it to the left in the present case causes the synchronous actuation frame 45 to be pulled by the second eccentric to the right in the case shown schematically here. This pulling movement continues beyond the entire pillar anchoring means 13 into the region of its left-hand actuating slide switch 40. This left-hand actuating slide switch 40 is then pulled from the left to the right by the synchronous actuation frame. In the process, it pushes the keys 38 connected to it likewise via flexible bar springs from their open position to the right into their closed position.

In this way, a sample table or a sample cross member 11 can be changed simply and manageably. After the removal of the compartment bounding the sample chamber 5, the sample table or sample cross member 11 is held in one hand while the other hand turns the pivot handle 42 90°. The sample table or sample cross member 11 can then be removed downwards with one hand.

The invention claimed is:

1. A material analysis device for analysing a material sample,
having;
   a sample chamber, and
   a sample holder, which is supported by at least one pillar and protrudes into the sample chamber, and
   a loading shaft having one end to which force is applied by an exciter and an other end which bears a probe shaft, wherein the probe shaft transmits the force to the sample in a defined manner and thereby loads the sample,
   wherein the loading shaft forms a bushing at the other end facing the sample chamber, the bushing accommodating an insertion section of the probe shaft when in a ready-to-operate state,
   wherein the bushing has at least one lateral window, through which a key, is insertable into a groove in the insertion section, by means of which the
probe shaft is fixed without play to the loading shaft.

2. The material analysis device according claim 1, wherein the bushing of the loading shaft forms a first centring taper which, together with a second centring taper on the insertion section of the probe shaft, centres the probe shaft relative to the loading shaft.

3. The material analysis device according to claim 2, wherein the key and the groove in the insertion section of the probe shaft are formed such that the key draws the second centring taper on the insertion section of the probe shaft into the first centring taper of the bushing as the key is introduced into the groove.

4. The material analysis device according to claim 1, wherein a flexible spring is fastened to the outside of the loading shaft and preloads the key in a radial direction towards the loading shaft, and wherein the flexible spring is a leaf spring.

5. The material analysis device according to claim 4, wherein the key is connected at a radially outward end to the leaf spring such that the leaf spring is configured to transmit tensile forces to the key.

6. The material analysis device according to claim 5, wherein the key is connected interlockingly to the leaf spring in the manner of a bayonet closure.

7. The material analysis device according to claim 4, wherein the key is connected interlockingly to the leaf spring in the manner of a bayonet closure.

8. The material analysis device according to claim 4, wherein the leaf spring has an elongated free end, which protrudes beyond the key in a direction of a longitudinal axis of the loading shaft and which, as the loading shaft moves further into a sample space, comes up against a stop so that the leaf spring is spread outwards in the radial direction and pulls the key out of the groove such that the probe shaft is removable from the loading shaft.

9. The material analysis device according to claim 1, wherein a cover of the sample chamber has a holding opening for each of the at least one pillar, wherein a free end of each of the at least one pillar is insertable into the respective holding opening, wherein the free end of the at least one pillar in question bears the groove into which the key mounted movably in the cover is insertable so that the free end of the pillar is anchored interlockingly without play on the cover.

10. The material analysis device according to claim 9, wherein the holding opening is designed completely or partially as a blind hole such that the key mounted in the cover clamps the free end of the at least one pillar assigned to the key between a key face of the key and a bottom of the blind hole.

11. The material analysis device according to claim 10, wherein a synchronous actuation reproduction mechanism is integrated in the cover and actuates all the keys synchronously.

12. The material analysis device according to claim 9, wherein a synchronous actuation reproduction mechanism is integrated in the cover an actuates all the keys synchronously.

13. The material analysis device according to claim 12, wherein the synchronous actuation reproduction mechanism comprises an eccentric, which, during corresponding rotation, exerts a compressive force on at least one key, the compressive force pushes said key into a groove in a pillar, and at the same time exerts tension on a synchronous actuation frame, which, when pulled into another position thereby, in turn exerts another compressive force on at least one second key, the another compressive force pushes said at least one second key into a groove in another pillar.

14. The material analysis device according to claim 13, wherein the keys communicate with the eccentric and the synchronous actuation frame indirectly via spring elements.

15. The material analysis device for analysing a material sample preferably according to claim 1, having a measurement system arranged outside the sample chamber, wherein at least one region outside the sample chamber, between the sample chamber and the measurement system, is automatically cooled by a cooling system based on heat pipe technology, wherein at least one heat pipe is provided, which is hollow and hermetically sealed and in which a cooling fluid automatically circulates, wherein a heat-absorbing end of the heat pipe is connected in a thermally conductive manner to a wall region of the sample chamber to be cooled, and wherein a heat-emitting end of the heat pipe is connected to a cooling body and/or coolant flows against the outside of the heat-emitting end.

16. A material analysis device for analysing a material sample,
having:
   a sample chamber, which is configured to be loaded, is configured to be closed by a cover, and is temperature-controllable, and
   a sample holder, which is fastened to the cover by at least two pillars and then protrudes, supported by the cover, into the sample chamber, and
   a loading shaft having one end to which force is applied by an exciter and an other end which bears a probe shaft, wherein the probe shaft transmits the force to the sample in a defined manner and thereby loads the sample,
   wherein the loading shaft forms a bushing at the other end facing the sample chamber, the bushing accommodating an insertion section of the probe shaft when in a ready-to-operate state, wherein the bushing has at least one lateral window, through which a key, is insertable into a groove in the insertion section, by means of which the probe shaft is fixed without play to the loading shaft.

17. The material analysis device according to claim 16, wherein the bushing of the loading shaft forms a first centring taper, which, together with a second centring taper on the insertion section of the probe shaft, centres the probe shaft relative to the loading shaft.

* * * * *